UNITED STATES PATENT OFFICE.

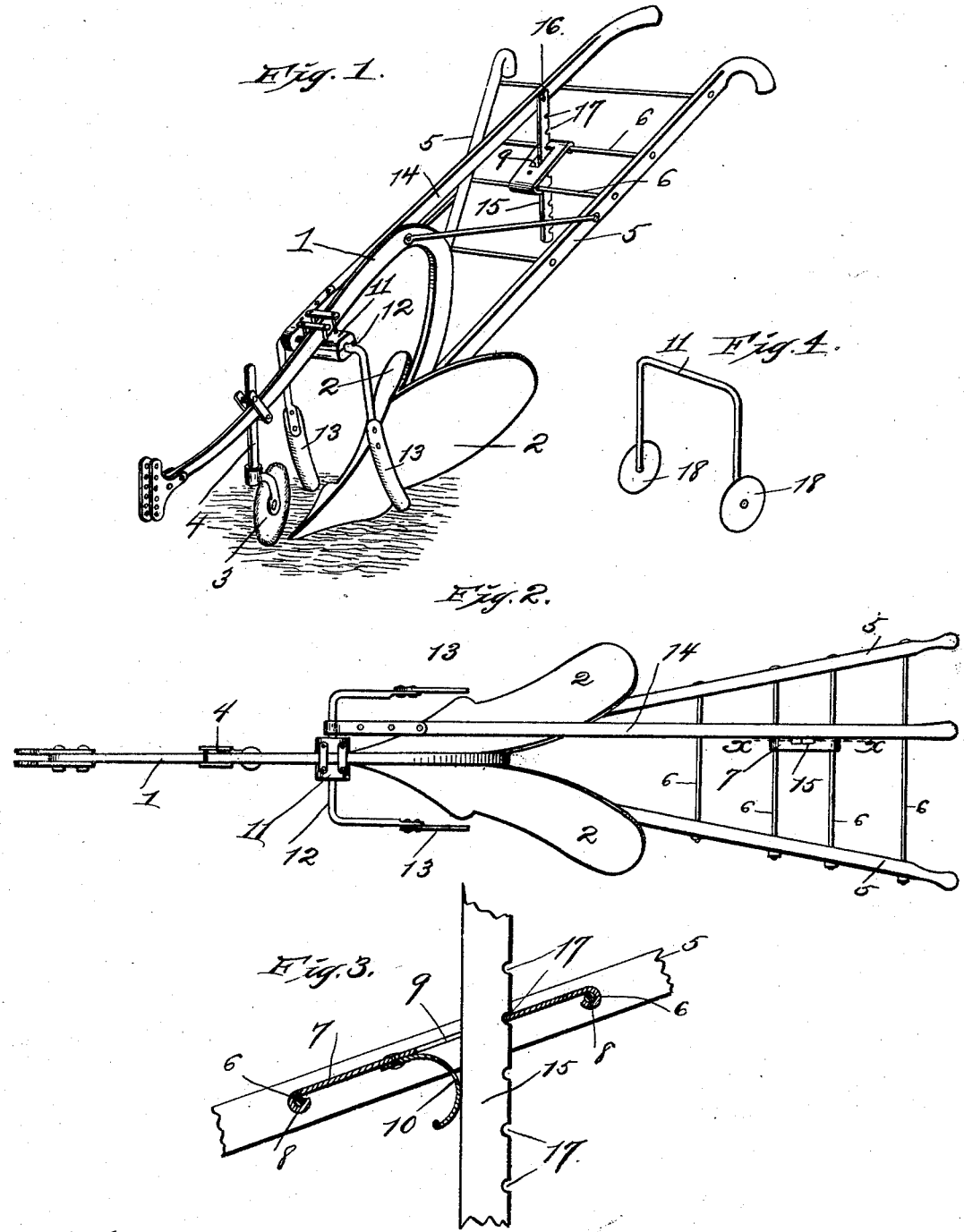

GEORGE W. SCOTT, OF BELTON, MISSOURI.

LISTER FOR SOD-LAND.

SPECIFICATION forming part of Letters Patent No. 509,952, dated December 5, 1893.

Application filed July 13, 1893. Serial No. 480,435. (No model.)

*To all whom it may concern:*

Be it known that I, GEORGE W. SCOTT, of Belton, Cass county, Missouri, have invented certain new and useful Improvements in Listers for Sod-Land, of which the following is a full, clear, and exact description, reference being had to the accompanying drawings, forming a part hereof.

My invention relates to double colter attachments for plows, for listing sod-land; and consists in providing a pair of colters or cutters depending in front of the mold-boards, and which will cut the sod in parallel lines, which in conjunction with the central colter-wheel which cuts the sod in advance of the point of the plow forms practically two continuous sods, and the mold-board following in the wake of said pendent colters or cutters turns said sod completely over upon each side of the furrow. By thus cutting the sod, the plow runs much easier. In plowing tough-sod the tendency of the sod after being turned by the plow, is to spring back into the furrow, unless cut as referred to.

My object is to provide a device of this character wherein the side colters may be adjusted, and which is simple, strong, and inexpensive of construction.

With this object in view my invention consists in certain peculiar and novel features of construction and combinations of parts, as will be hereinafter described and claimed.

In order that my invention may be fully understood, I will proceed to describe it with reference to the accompanying drawings, in which—

Figure 1, is a perspective view, of a double-mold board plow, and having a device applied thereto constructed in accordance with my invention. Fig. 2, is a top plan view of the same. Fig. 3, is a vertical sectional view taken on the line $x$—$x$ of Fig. 2, and on an enlarged scale. Fig. 4, is a detail view of a slightly modified form of construction, of the double colters.

In the drawings, 1 designates a plow beam of the usual construction, and carrying a plow thereon formed with the two mold-boards 2—2. A wheel-colter 3 is carried upon the lower end of the standard 4 which is secured to the plow-beam in the usual manner, and this wheel-colter is adapted to cut the sod in advance of the point of the plow. Extending divergently outward and secured in the usual manner are the plow handles 5—5, which are braced from the plow beam in the usual manner, and are braced laterally by the cross rods or bars 6. A pair of these cross-rods 6 are connected by a longitudinally extending plate 7, the ends of said plate 7 being bent or turned around said cross rods as shown at 8 preferably, and this plate 7 is also formed with a central and longitudinally extending slot or elongated opening 9.

Riveted or secured in any suitable manner at one end to the under side of the plate 7 and forward of the slot 9 is a spring 10, the object of which will be hereinafter explained.

A bearing box 11 is secured by bolts or cross-bars as shown, or in any other suitable manner to the plow-beam a suitable distance rearward of the colter wheel standard, and journaled to rock in said bearing is the bridge-portion 12 of a U-frame or bar, and secured to the lower ends of said U-frame or bar are the colter-knives or cutters 13. A lever 14 is rigidly secured at its forward end upon the bridge-portion 12 of said U-frame in any suitable manner, and adjacent to one side of the bearing 11, and this lever extends rearwardly and upwardly, so that its rear end shall be adjacent to and within convenient reach of the plow director.

A bar 15 is pivotally connected at its upper end at 16 to the side of the lever 14, and this bar 15 passes upwardly through the slot or elongated opening 9 of the plate 7, and is arranged so that the rearwardly projecting spring 10 shall bear against the forward edge of said bar, and in order to hold said bar at any desired point of vertical adjustment, a series of notches or recesses 17 are formed in its rear edge, one or the other of which is adapted to engage the rear margin of the slot or opening 9, the presser-spring 10 holding said notch or recess firmly in engagement with the plate. It will thus be seen that by pushing the lower end of the bar 15 forwardly, the resistance of the presser-spring 10 may be overcome, and the lever 14 may be pivotally operated either upwardly or downwardly, so as to raise the colters 13 rearwardly and upwardly or forwardly and downwardly respectively; the raised position of said colters being the inoperative position, and the lowered position being the position the colters assume in operation.

The operation of the device is as follows: The plow being moved across the field the wheel-colter 3 cuts the sod in advance of the point of the plow, and the shares of the plow begin to lift or raise the sod from either side of the line cut by the colter 3. But, before the sod is turned, the colters or cutters 13 arranged upon each side of the plow shares cut the sod in advance of the rear and outer edges of the shares, and in lines parallel with the central line cut by colter-wheel 3; thus forming practically two continuous sods. The mold-boards 2, following immediately in the wake of the colters or cutters 13 turn the sods completely over so that they shall lie flat with the grass side down, upon opposite sides of the furrow.

Among other features, the earth will be enriched, because the sod being cut will decay in a much shorter time than should they be simply turned from the furrow.

Referring to Fig. 4, I show the U-frame provided at its lower end with small colter wheels 18, these colter wheels acting in a manner similar to the colters 13, and cutting the sod as before described.

Having thus described my invention, what I claim as new, and desire to secure by Letters Patent, is—

1. In a plow, the combination with a plow beam, and a plow having double mold-boards carried thereby, and a bearing secured to said plow beam, of a frame pivotally mounted in said bearing, and having colters or cutters upon its lower end, and a lever rigidly connected to said frame, and adapted when operated to move the colters or cutters of said frame, and means to lock said colters or cutters at any desired point of adjustment, substantially as set forth.

2. In a plow, the combination with a beam and a plow carried thereby having double mold-boards, and a rock frame having cutting knives or colters carried by said plow beam, and a lever operatively connected to said rock frame, of a plate having an opening, and a notched bar pivotally connected to the lever and passing through said opening, and a spring to hold one or the other of the notches of said bar into engagement with the rear margin of said opening, substantially as set forth.

In testimony whereof I affix my signature in the presence of two witnesses.

GEORGE W. SCOTT.

Witnesses:
G. Y. THORPE,
M. P. SMITH.